US007458453B2

(12) United States Patent
Brückner et al.

(10) Patent No.: US 7,458,453 B2
(45) Date of Patent: Dec. 2, 2008

(54) DISK CLUTCH AND METHOD FOR OPERATING SAME

(75) Inventors: Lothar Brückner, Leonberg (DE); August Kästner, Welzheim (DE)

(73) Assignee: Christian Bauer GmbH + Co., Welzheim (DE)

( * ) Notice: Subject to any disclaimer, the term of this patent is extended or adjusted under 35 U.S.C. 154(b) by 218 days.

(21) Appl. No.: 10/562,407

(22) PCT Filed: Apr. 29, 2004

(86) PCT No.: PCT/DE2004/000900

§ 371 (c)(1), (2), (4) Date: Dec. 23, 2005

(87) PCT Pub. No.: WO2005/010391

PCT Pub. Date: Feb. 3, 2005

(65) Prior Publication Data

US 2006/0137957 A1    Jun. 29, 2006

(30) Foreign Application Priority Data

Jun. 27, 2003   (DE) ................................ 103 29 123

(51) Int. Cl.
*F16D 25/0638* (2006.01)
*F16D 25/12* (2006.01)
(52) U.S. Cl. ................................ 192/85 AA; 192/30 W
(58) Field of Classification Search .............. 192/30 W, 192/109 A
See application file for complete search history.

(56) References Cited

U.S. PATENT DOCUMENTS 5,641,048 A    6/1997   Von Gaisberg

| 5,758,758 A * | 6/1998 | Friedrich ................ 192/91 R |
| 6,167,997 B1 * | 1/2001 | Keeney ................... 192/40 |
| 6,540,059 B2 * | 4/2003 | Drexl ..................... 192/86 |
| 2003/0089177 A1 * | 5/2003 | Luthje et al. ............. 73/760 |

FOREIGN PATENT DOCUMENTS

DE    37 141 95 A    11/1988

(Continued)

OTHER PUBLICATIONS

International Search Report.

*Primary Examiner*—Richard M. Lorence
*Assistant Examiner*—Edwin A. Young
(74) *Attorney, Agent, or Firm*—Collard & Roe, P.C.

(57) ABSTRACT

The invention relates to a clutch, particularly a multi-disk clutch, of an, in particular, manual transmission for, in particular, vehicles having a spring force of a spring device, said spring force influencing the adjusting force, which is produced in a power source and which serves to actuate the clutch. This clutch should be able to operated while maintaining predetermined closing and/or opening times that are as precise as possible. In addition, the closing and/or opening times should be independent of possible changes in properties of the spring device. To this end, a clutch of the aforementioned type is characterized in that the spring device (3) and/or at least one of its thrust bearings is provided with a sensor (4), which detects solid body changes and which serves to determine the spring force exerted by the spring device (3), and a device for transmitting the determined measured values for controlling and/or regulating the adjusting power source.

4 Claims, 1 Drawing Sheet

FOREIGN PATENT DOCUMENTS

| | | |
|---|---|---|
| DE | 40 34 019 C1 | 7/1992 |
| DE | 198 22 193 A | 11/1999 |
| DE | 198 31 372 A1 | 1/2000 |
| DE | 199 54 164 A1 | 6/2001 |
| DE | 101 08 186 A | 9/2002 |
| DE | 101 61 205 A | 6/2003 |
| DE | 103 16 445 A | 10/2003 |
| EP | 0 533 709 B1 | 3/1993 |

* cited by examiner

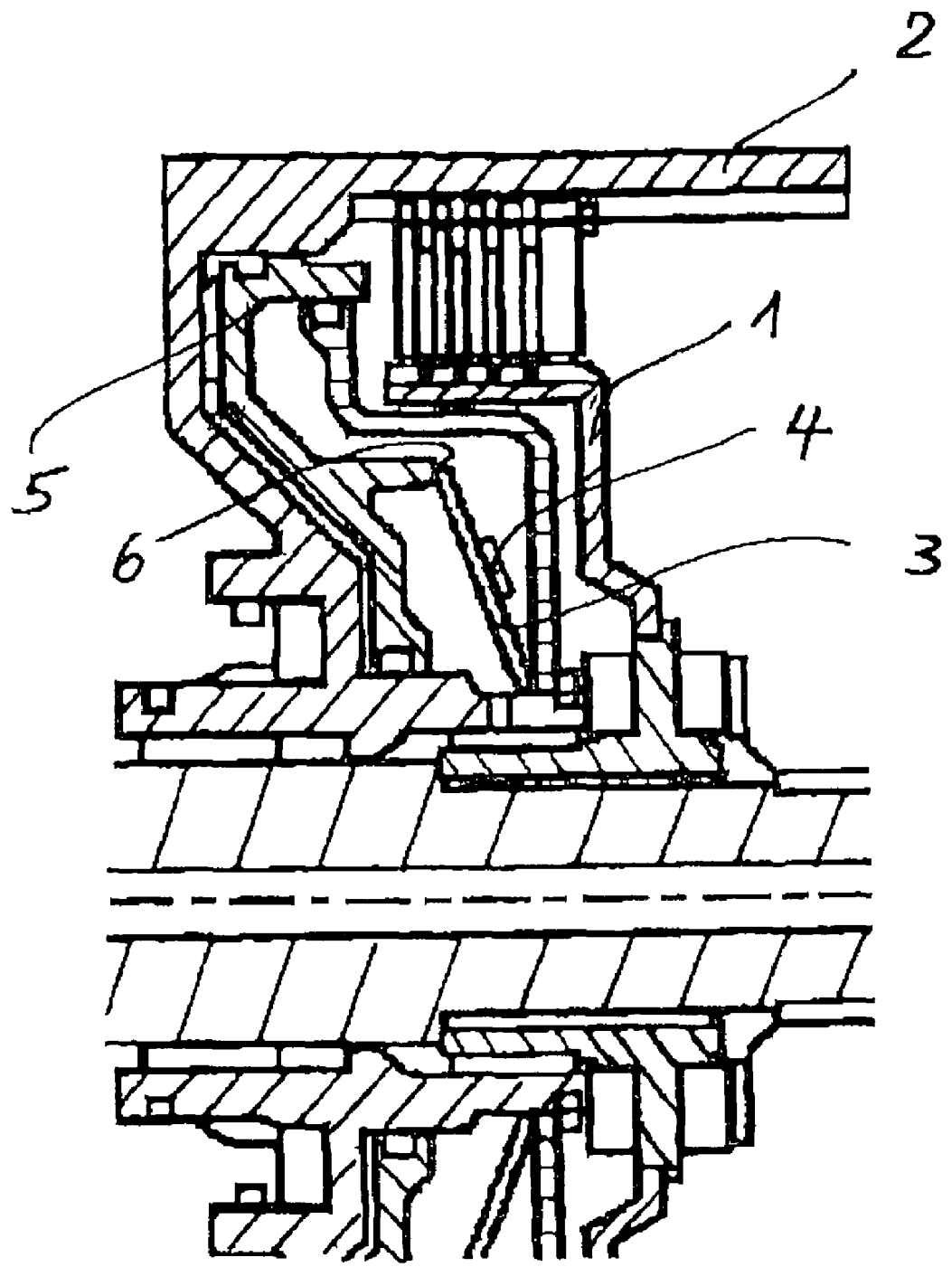

DISK CLUTCH AND METHOD FOR OPERATING SAME

CROSS REFERENCE TO RELATED APPLICATIONS

Applicants claim priority under 35 U.S.C. §119 of German Application No. 103 29 123.7 filed on Jun. 27, 2003. Applicants also claim priority under 35 U.S.C. §365 of PCT/DE2004/000900 filed on Apr. 29, 2004. The international application under PCT article 21(2) was not published in English.

BACKGROUND OF THE INVENTION

1. Field of the Invention

This invention relates to a clutch and a method for operating such a clutch.

2. Description of Related Art

Operation of a generic clutch is influenced by the properties of the spring mechanism, among other things. The spring force produced by the spring mechanism can vary due to the manufacturing or can be varied as a function of operating time.

A power-shift transmission such as an infinitely variable, automatic power-shift transmission for vehicles having a generic clutch is known from German Patent DE 198 22 193 A1, which is a hydrodynamically operated multi-disk clutch. The closing force of this clutch is generated by a hydraulic cylinder which actuates a piston acting on the clutch disks against the force of a plate spring. The opening force is applied by the plate spring as a spring device of this clutch. The opening of the clutch, which is produced by the plate spring, must occur during an accurately predetermined period of time, i.e., within a certain time window, for optimum functioning of the shift transmission. To this end, the hydraulic pressure within the hydraulic cylinder, which is responsible for the closing of the clutch, is monitored by pressure sensors and used as control and/or regulating variables for the operation of the clutch. The measured values obtained by the pressure sensors depend on the temperature, among other things, due to the change in viscosity of the hydraulic fluid.

U.S. Pat. 5,641,048 A describes a friction clutch in which a pressure valve is spring loaded, whereby the contact pressure emanating from the spring is detected. To equalize wear on a friction clutch, a readjusting device is provided, operated as a function of the detected contact pressure of the spring for pressure equalization. The readjusting device should not be actuated during clutch operation, but instead preferably when the clutch is at standstill or possibly still in a low rpm range, which is below the rpm range in conventional clutch operation. With the device known in the past, blocking devices are provided in particular to safely prevent adjustments by the readjusting device during operation of the clutch.

German Patent DE 101 61 205 A1 describes a clutch in which the clutch pressure piece is moved by the force of a plate spring that can be displaced between an engaged position and a disengaged position. This plate spring is provided with an adjusting device by means of which a readjustment is possible to compensate for wear on the clutch. The adjustment device is equipped with a sensor by which the need for a readjustment and the extent thereof are detected.

The clutch known from German Patent DE 101 08 186 A relates only to a readjustment device for a clutch.

SUMMARY OF THE INVENTION

This invention relates to the problem of permitting opening and/or closing of the clutch with the greatest possible time precision in a generic clutch. Changes that may result from a change in the properties of the spring mechanism should also be reliably avoided.

This problem is solved with a generic disk clutch by a design according to the characterizing features of Patent Claim 1.

This problem is solved with a generic disk clutch in which the adjusting force is regulated according to the operating states prevailing at the moment, namely at a predetermined level, by an embodiment according to the invention.

According to this invention, this predetermined value is monitored by measured values from a sensor provided on the spring mechanism and/or at least on one of its thrust bearings. The present invention differs from the generic device according to German Patent DE 198 22 193 A1 in particular in that the pressure value is not monitored by a pressure value measurement inside the hydraulic pressure source.

This difference also exists in comparison with the other clutches cited above as belonging to the state of the art, because those clutches each have pressure sensors on the spring mechanisms by means of which the spring mechanisms can be readjusted according to the measured pressure changes when there is wear on the clutch. The previously known clutches do not have regulation of the contact pressure of the pressure valve of the clutch according to the measured pressure values of the pressure sensor provided on the spring mechanism.

Advantageous and expedient embodiments of this device are also the object of the invention.

An advantageous method of operating an inventive clutch is also the object of the invention.

In a spring device consisting of at least one plate spring or together with a shaft spring, also known as an ondular washer, the sensor is advantageously mounted directly on the at least one plate spring and/or shaft spring in an area not adjacent to a thrust bearing. It is of course also possible to provide the sensor on a particular thrust bearing of the spring mechanism.

When using plate springs and/or shaft springs, it is especially advantageous to provide as the sensor a piezoresistive amorphous carbon layer (e.g., DLC (diamond-like carbon) layer) applied permanently to a surface area not in direct contact with a thrust bearing. The carbon layer must have a thickness of only 10 nm to 500 µm, preferably 10 nm to 20 µm. Such layers, which may be applied by a PVD (physical vapor deposition) method or a CVD (chemical vapor deposition) method and are used to produce sensors for determining the state of characteristics of mechanical components, are described in German Patent DE 199 54 164 A1. Washers provided with measurement layers are known from German Patent DE 198 31 372 A1 for monitoring non-positive connections.

An inventive method for operating a generic shift transmission consists of controlling and/or regulating an adjusting force acting on the clutch by means of characteristic values of the spring mechanism determined as current values by the sensor and/or its at least one thrust bearing.

The transfer of the measured values detected by the sensor may be transmitted in an especially advantageous manner via a telemetric signal pickup. The high measurement sensitivity of the inventive sensors is especially suitable for a telemetric signal analysis. With respect to the principle of telemetric signal analyzing methods applicable here, reference is made in the state of the art to German Patent DE 40 34 019 C1, European Patent 0 533 709 B1 and German Patent DE 37 14 195 A1, for example.

An advantageous exemplary embodiment to be explained in greater detail below is depicted in the drawing.

In this drawing, the only figure shows:

FIG. 1 a half section through a schematic diagram of a multi-task clutch of a manual transmission.

A first body 1 and a second body 2, each rotatably mounted, are interconnectable in a non-positive manner by means of intermeshing disks.

A piston is mounted on the second body 2 in a rotationally fixed but axially displaceable manner. With this piston 5, the disks of the two bodies, 1, 2 can be pressed together in a non-positive manner for engaging the clutch.

To disengage the clutch, a plate spring serves as the spring mechanism 3 by means of which the piston 5 is shifted to achieve an opened state of the clutch. A hydraulic pressure (not depicted in the drawing) acts on the piston 5 to engage the clutch, namely acting against the force of the plate spring 3. The piston 5 determines the duration of the opening of the clutch under the force of the plate spring 3.

The plate spring 3 is provided with a DLC layer as the sensor 4. The measured values obtained by the sensor 4, similar to the current spring force of the plate spring 3, are preferably sent telemetrically to an electronic analyzer unit, from which the measured values can be utilized to control and/or regulate the adjusting force acting on the clutch. The deceleration fore of the hydraulic pressure applied to the piston 5 counteracting the opening of the clutch should be part of the aforementioned actuating force and/or adjusting force acting on the clutch in the sense of the description of the present invention.

In the electronic analyzer unit, the actual measured values measured by the sensor 4 can be modified to take into account the properties of the physical state influencing these measured values in or on the spring mechanism. The thrust bearing of the spring device 3 is identified by reference numeral 6.

The invention claimed is:

1. A disk clutch, with which a first body (1) and a second body (2) in which a piston (5) to which a hydraulic pressure is applied is mounted in a rotationally fixed but axially displaceable manner, are connected to one another in a non-positive manner via intermeshing disks that can be acted upon by the force of the piston (5), of a manual transmission for motor vehicles, with a spring force of a spring mechanism which influences an adjusting force produced by a power source for operation of the clutch, wherein the spring mechanism (3) and/or at least one of a plurality of thrust bearings (6) associated with the spring mechanism is provided with a sensor (4) which detects solid-state changes for determining the spring force emanating from the spring mechanism (3) and a device for transmitting the measured values thus determined for regulating the adjusting power source, whereby a deceleration force of the hydraulic pressure applied to the piston (5) counteracting the spring mechanism in the opening of the clutch is part of the adjusting force or thrust force acting on the clutch; and wherein the sensor (4) is designed as a piezoresistive, amorphous carbon layer applied permanently to a surface area of the spring mechanism (3) or the thrust bearing (6).

2. The clutch according to claim 1, wherein the spring mechanism (3) consists of at least one plate spring or a combination of a plate spring with an ondular washer.

3. The clutch according to claim 1, wherein the sensor (4) is provided with means for a telemetric signal pickup.

4. A method for operating a clutch comprising the steps of providing a disk clutch, with which a first body (1) and a second body (2) in which a piston (5) to which a hydraulic pressure is applied is mounted in a rotationally fixed but axially displaceable manner is connected to one another in a non-positive manner via intermeshing disks that can be acted upon by the force of the piston (5), of a manual transmission for motor vehicles, with a spring force of a spring mechanism which influences an adjusting force produced by a power source for operation of the clutch, wherein the spring mechanism (3) and/or at least one of a plurality of thrust bearings (6) associated with the spring mechanism is provided with a sensor (4) which detects solid-state changes for determining the spring force emanating from the spring mechanism (3) and a device for transmitting the measured values thus determined for regulating the adjusting power source, whereby a deceleration force of the hydraulic pressure applied to the piston (5) counteracting the spring mechanism in the opening of the clutch is part of the adjusting force or thrust force acting on the clutch; and controlling and/or regulating the adjusting force acting on the clutch as a function of characteristic values of the spring mechanism (3) currently determined by the sensor (4); and wherein the sensor (4) is designed as a piezoresistive, amorphous carbon layer applied permanently to a surface area of the spring mechanism (3) or the thrust bearing (6).

* * * * *